United States Patent [19]

Fujita et al.

[11] Patent Number: 5,723,554
[45] Date of Patent: Mar. 3, 1998

[54] PROCESS FOR PRODUCING STYRENIC POLYMER

[75] Inventors: Masayuki Fujita; Hayato Kihara; Takahiro Ishii, all of Chiba, Japan

[73] Assignee: Sumitomo Chemical Company, Limited, Osaka, Japan

[21] Appl. No.: 709,271

[22] Filed: Sep. 6, 1996

[30] Foreign Application Priority Data

Sep. 6, 1995 [JP] Japan .................................. 7-229374

[51] Int. Cl.⁶ .............................. C08F 4/34; C08F 2/08
[52] U.S. Cl. ...................... 526/204; 526/219; 526/220; 526/232.1; 526/346
[58] Field of Search ...................... 526/346, 86, 87, 526/88, 204, 232.1

[56] References Cited

U.S. PATENT DOCUMENTS

| | | | |
|---|---|---|---|
| 5,115,055 | 5/1992 | Dias et al. | 526/346 X |
| 5,115,066 | 5/1992 | Zimmermann et al. | 526/346 |
| 5,312,871 | 5/1994 | Mardare et al. | 526/184 X |
| 5,401,804 | 3/1995 | Georges et al. | 525/267 |

FOREIGN PATENT DOCUMENTS 0307238  3/1989  European Pat. Off. ........ C08F 12/08
0308916  3/1989  European Pat. Off. ........ C08F 12/08

OTHER PUBLICATIONS

"Molecular Weight Control by a 'Living' Free–Radical Polymerization Process," by Craig J. Hawker, *J. Am. Chem. Soc.*, 1994, 116, 11185–11186.

"Living Free–Radical Aqueous Polymerization," by Barkev Keoshkerian et al., *Macromolecules*, 1995, 28, 6381–6382.

*Primary Examiner*—Fred Teskin
*Attorney, Agent, or Firm*—Sughrue, Mion, Zinn, Macpeak & Seas, PLLC

[57] ABSTRACT

There is provided a process for producing a styrenic polymer having a weight average molecular weight (Mw) of 200,000–500,000, a number average molecular weight (Mn) of 100,000–450,000 and a molecular weight distribution (Mw/Mn) of from 1.1 to 2 by free radical polymerization.

There is also provided a styrenic polymer, a styrenic resin composition comprising such polymer and a molded article comprising such composition.

Said styrenic polymer and said resin composition have excellent flowability during molding and also excellent mechanical strength.

3 Claims, No Drawings

PROCESS FOR PRODUCING STYRENIC POLYMER

BACKGROUND

There is provided a process for producing a styrenic polymer, a styrenic resin composition comprising said styrenic polymer and a molded article produced therefrom. The styrenic polymer has an excellent balance of flowability and mechanical strength. This styrenic polymer has a narrow molecular weight distribution. A free radical polymerization process may be used to prepare this polymer. Further provided herein are a styrenic resin composition comprising said styrenic polymer, an injection-molded article, extrusion-molded article and foam molded article formed from said styrenic resin composition.

Styrenic polymers produced by conventional free radical polymerization process have rigidity, excellent dimensional stability and are low-priced. As a result, they have been widely used for molded articles. It is further noted that there has been a recent demand for making lighter, large-sized moldings in injection molding applications. For making lighter, thinner walled, molded articles it is essential to have high flowability during molding in addition to high mechanical strength.

As an attempt for meeting such requirements, a method has been proposed in which the molecular weight of resin is made higher in order to obtain a resin with higher mechanical strength. The attempted method has, however, a problem in that short shot tends to occur on molding due to lowered flowability of the resin. Even if an article is obtained by the method, the method also has a problem in that residual strain of the molded article becomes high due to its higher flow shearing, resulting in lowered mechanical strength.

A method in which a plasticizer, such as mineral oil, is added to a resin has been proposed in order to increase the flowability of the resin without lowering its molecular weight. The method has, however, a problem in that the heat resistance and the mechanical strength of the resin are lowered due to the added plasticizer.

Production of extrusion-molded articles, such as films and sheets, has been widely practiced by extruding styrenic polymers. For the molding of extrusion-molded articles, it is desirable that the articles have excellent mechanical strength, while keeping their transparency and flowability at respective satisfactory levels.

As an attempt for meeting such requirements, a method has been known in which the molecular weight of the resin is made higher in order to obtain a resin with higher mechanical strength. The attempted method has, however, a problem in that the flowability of the resin is lowered, and productivity on extrusion decreases.

Production of foam molded articles has been widely practiced by foam molding styrenic resins. In the resin foam molding process, it is required that a styrenic resin has properties including high mechanical strength and high flowability, which properties are necessary for satisfactory productivity during foam molding.

As an attempt for meeting such requirements, a method has been known in which the molecular weight of resin is made higher in order to obtain a resin with higher mechanical strength. The attempted method has, however, a problem in that the flowability of the resin is lowered, and productivity on foam molding decreases.

According to technical knowledge disclosed by Flory et al. [J. Am. Chem. Soc., 67 2048 (1945)] and J. A. Sauer et al. [Polymer, 19 858 (1978)], that the mechanical strength and the number average molecular weight (Mn) are correlated, it is necessary to increase the number average molecular weight (Mn) of the resin in order to increase the mechanical strength of the resin. Also, it is necessary to lower the weight average molecular weight (Mw) of the resin in order to increase its flowability. Further, since there is a relation Mn≦Mw, it is necessary for a resin to have narrower molecular weight distribution (Mw/Mn) in order to have high flowability and high mechanical strength.

For narrowing the molecular weight distribution, a polymerization method by anion polymerization has been proposed. The anion polymerization has problems in that it needs severe conditions, its manufacturing costs are high, as compared with the free radical polymerization, and the product is colored by residual catalyst.

U.S. Pat. No. 5,401,804 (JP-A-6-199916) discloses a free-radical polymerization method for obtaining a thermoplastic resin having a narrow molecular weight distribution by mixing a free-radical initiator and stable free-radical agent with a polymerizable monomer compound and maintaining the mixture at 100°–160° C. The weight average molecular weight of the resin composition obtained by this method is about 10,000–70,000. Thus, the mechanical strength of the resin is insufficient for use in injection molding, extrusion molding and foam molding.

SUMMARY

There is provided a process for producing a styrenic polymer by free radical polymerization, said process comprising the steps of:

(1) forming a mixture of styrenic compound, free radical initiator and radical scavenger, wherein the concentration of the free radical initiator (I; % by mol) based on the amount of a styrenic compound satisfies the formula $$2\times10^{-3}\leq I\leq 4\times10^{-2}$$

and wherein the concentration of the radical scavenger (C; % by mol) and the active site concentration of the free radical initiator (A; % by mol) based on the amount of a styrenic compound satisfy the formula $$0.8\leq C/A\leq 4;$$

(2) maintaining the mixture of step (1) under free radical polymerization conditions including a polymerization temperature (T) of from 100° C. to 140° C., wherein I, C, A and T satisfy the formula $$10^3\times I+6\times C/A+0.86\times(T-100)\leq 48;$$

(3) discontinuing the polymerization when the conversion of styrenic compound is from 40% to 85%; and (4) recovering a styrenic polymer.

wherein the styrenic polymer recovered in step (4) has a weight average molecular weight (Mw) of 200,000 to 500,000, a number average molecular weight (Mn) of 100,000 to 450,000 and a molecular weight distribution (Mw/Mn) of from 1.1 to 2.

The present process produces a styrenic polymer which has excellent flowability and excellent mechanical strength. Thereby, the styrenic polymer can provide thinner and lighter molded articles, when used in molding applications.

The styrenic polymer obtained by the above process may be used in a resin composition comprising said styrenic polymer, as well as in an injection-molded article, an extrusion-molded article and in a foam molded article.

The present inventors have completed embodiments described herein after extensive research to solve the above described problems.

The present process for producing a styrenic polymer involves free radical polymerization of a styrenic compound.

The free radical initiator may be added to the reaction system, such that the concentration of the free radical initiator (I; % by mol) based on the amount of the styrenic compound satisfies $(2\times10^{-3}) \leq I \leq (4\times10^{-2})$.

A radical scavenger is added to the reaction system, such that the concentration of the radical scavenger (C; % by mol) and the active site concentration of the free radical initiator (A; % by mol) based on the amount of the styrenic compound satisfy $0.8 \leq C/A \leq 4$.

The polymerization temperature (T; °C.) range is from 100° C. to 140° C.

The concentration of the free radical initiator (I), the ratio of the concentration of the radical scavenger to the active site concentration of the free radical initiator (C/A), and the polymerization temperature (T) satisfy the following relation:

$$(10^3 \times I) + (6 \times C/A) + \{0.86 \times (T-100)\} \leq 48.$$

The polymerization is continued until the conversion of the styrenic compound is 40–85%.

The styrenic polymer, which may be recovered by conventional techniques, has a weight average molecular weight (Mw) of 200,000 to 500,000, a number average molecular weight (Mn) of 100,000 to 450,000 and a molecular weight distribution (Mw/Mn) of from 1.1 to 2.

DETAILED DESCRIPTION

The styrenic polymer according to the present invention has a weight average molecular weight (Mw) of 200,000–500,000, preferably 230,000–450,000 and a number average molecular weight (Mn) of 100,000–450,000, preferably 130,000–400,000. When the weight average molecular weight or the number average molecular weight is too small, the polymer obtained has inferior mechanical strength. When the weight average molecular weight or the number average molecular weight is too large, the polymer obtained has inferior flowability.

The styrenic polymer according to the present invention has a molecular weight distribution (Mw/Mn) of from 1.1 to 2, usually 1.1 or more and less than 2, preferably of from 1.1 to 1.9, more preferably of from 1.1 to 1.8, and further more preferably of from 1.5 to 1.8. When the molecular weight distribution is too large, the polymer obtained has inferior mechanical strength.

In the present process, the concentration of the free radical initiator (I; % by mol) in the solution should be $$2\times10^{-3} \leq I \leq 4\times10^{-2}$$

based on the amount of the styrenic compound. When I is too small, polymerization velocity is low and productivity is inferior. When I is too large, the polymer obtained has a too small of a molecular weight and the polymer does not have high mechanical strength.

The ratio of the concentration of the radical scavenger (C; % by mol) and the active site concentration of the free radical initiator (A; % by mol) should be $0.8 \leq C/A \leq 4$. When said ratio is too small, the polymer obtained has a broad molecular weight distribution and has inferior mechanical strength. When the ratio is too large, polymerization velocity is low, productivity is inferior, the molecular weight is low and the polymer has inferior mechanical strength.

In the present process, the polymerization temperature (T; °C.) should be 100° C. at above and 140° C. or below.

In addition, i) the concentration of the free radical initiator (I), ii) the ratio (C/A) of the concentration of the radical scavenger (C) and the active site concentration of the free radical initiator (A) and iii) the polymerization temperature (T) should satisfy the following relation:

$$10^3 \times I + 6 \times C/A + 0.86 \times (T-100) \leq 48$$

When they do not satisfy this relation, the molecular weight of the polymer obtained is low and the polymer has inferior mechanical strength.

As described herein, the concentration of the free radical initiator means a value, expressed in percentage, of a molar number of the free radical initiator charged on polymerization divided by a molar number of styrenic compound charged on polymerization. Also, the concentration of the radical scavenger means a value, as represented in percentage, of a molar number of the radical scavenger charged on polymerization divided by a molar number of styrenic compound charged on polymerization.

In the present process, the polymerization is continued until the conversion of the styrenic compound is 40–85%.

The styrenic compound used in the present polymerization process may be a polymerizable styrenic compound, such as a styrene based monomer.

The styrenic compound used in the present process includes, for example, styrene; alpha-substituted alkylstyrene, such as alpha-methylstyrene or the like; nuclear-substituted alkylstyrene, such as p-methylstyrene, or the like and so on.

In the present process, a compound which is co-polymerizable with the styrenic compound can be co-used. Such compound includes, for example, a vinyl monomer, such as acrylonitrile, methacrylonitrile, methacrylic acid, acrylic acid; ester derivatives including methyl methacrylate, methyl acrylate or the like; and further maleic anhydride, maleimide, substituted maleimide and the like. Still further, a multifunctional monomer such as divinylbenzene or the like can also be co-used.

The polymerization of the styrenic compound in the present process can be conducted either by a batchwise process or a continuous bulk process. The polymerization vessel may be a complete mixing type stirred polymerization vessel; a plug flow type flooded (vertical or horizontal type) vessel; static mixing tube type vessel; and combinations of these polymerization vessels, for example, connected in series.

The preferred polymerization vessel is a vessel with less residence time distribution, for example, a plug flow type flooded (vertical or horizontal type) vessel; static mixing tube type vessel; a multi-stage complete mixing type stirred polymerization vessel; and combinations of these polymerization vessels. If the residence time distribution is large, the molecular weight distribution of the polymer may be increased.

The free radical initiator used in the present process is not particularly limited, and various kinds of free radical initiators can be used for this purpose. Usable free radical initiators include, for example, monofunctional initiators including organic monofunctional peroxides, such as benzoyl peroxide, t-butyl peroxybenzoate and the like; azo initiators, such as azobisisobutyronitrile and the like; and multifunctional initiators, including organic multifunctional peroxides, such as 1,1-bis(t-butylperoxy)-3,3,5-trimethylcyclo hexane, 2,2-bis(4,4-di-t-butylperoxycyclohexyl)propane and the like.

Among them, benzoyl peroxide, 1,1-bis(t-butylperoxy)-3,3, 5-trimethylcyclohexane and 2,2-bis(4,4-di-t-butylperoxycyclohexyl)-propane are preferred.

The "active site concentration of the free radical initiator" means the value of the number of groups capable of forming free radical per mol of free radical initiator multiplied by the concentration of the free radical initiator.

For example, since benzoyl peroxide has one peroxide bond, its active site concentration is [concentration of benzoyl peroxide]×1 (% by mol). Also, since 2,2-bis(4,4-di-t-butylperoxycyclohexyl)propane has four peroxide bonds, its active site concentration is (concentration of 2,2-bis(4,4-di-t-butylperoxycyclohexyl)-propane)×4 (% by mol).

The radical scavenger used in the present invention is a compound capable of bonding to and disassociating from a growing radical of polymer and can reach an equilibrium state. Various kinds of stable free radical agents can be used for this purpose.

The radical scavenger used in the present process includes stable free radicals, for example, 2,2,6,6-tetramethyl-1-piperidinyloxy (TEMPO); TEMPO derivatives, such as 4-amino-2,2,6,6-tetramethyl-1-piperidinyloxy, 4-hydroxy-2,2,6,6-tetramethyl-1-piperidinyloxy, 4-oxo-2,2,6,6-tetramethyl-1-piperidinyloxy or the like; 4,4-dimethyl-3-oxazolinyloxy and its derivatives; 2,2,5,5-tetramethyl-1-pyrrolidinyloxy and its derivatives; phenyl-t-butylnitroxide, 2,2-di(4-t-octylphenyl)-1-picrylhydrazyl (DPPH); and the like.

Among them, 2,2,6,6-tetramethyl-1-piperidinyloxy (TEMPO) is preferred.

The free radical initiator and the radical scavenger used in the present process may either be mixed with the styrenic compound before charging or separately and directly charged into a polymerization vessel.

In the process of the present invention, diluent such as ethylbenzene; lubricant; antistatic agent; antioxidant; heat stabilizer; ultraviolet absorber; pigment; dye; plasticizer, such as mineral oil; and so on may be added, if necessary, to the styrenic compound.

The resin composition according to the present invention may be a styrenic resin composition comprising a styrenic polymer obtained by the process described above. This resin usually contains 50% by weight or more of said styrenic polymer. Examples of other components, included in an amount less than 50% by weight in the resin composition, are polyolefins, such as polyethylene and polypropylene.

The resin composition of the present invention may contain, if necessary, lubricant, antistatic agent, antioxidant, heat stabilizer, ultraviolet absorber, pigment, dye, plasticizer, such as mineral oil, and so on.

The resin composition of the present invention can be used for various kinds of molded article by using conventional molding methods.

The resin composition of the present invention may be molded into an article by a conventional molding process, such as an injection molding process, an extrusion molding process and a foam molding process.

The injection molding can be conducted by a method in which the resin composition is, for example, melted by heating, injected from an injection unit to a mold, and cooled.

The resin composition of the present invention may be molded into an extrusion-molded article by a conventional extrusion molding method.

The extrusion can be conducted, for example, by a method in which the resin is melted in an extruder and then extruded through a T-die. Extrusion can also be conducted by a method in which the resin is extruded in the form of a sheet and then biaxially stretched by a tenter process or an inflation process.

The resin composition of the present invention may be molded into a foam molded article by a conventional foam molding method.

The foam molding can be conducted, for example, by a method in which a decomposable blowing agent and the resin composition are melt-kneaded in an extruder and then foam molded. Another method involves melting the resin composition in an extruder, adding a volatile blowing agent under the pressure directly into the extruder at the halfway point of the cylinder and then kneading and foam molding the resin. A further method involves impregnating small pellets or beads of the resin composition with a volatile blowing agent in an extruder or in an aqueous suspension and foam molding using steam, and the like.

As described above, styrenic polymers are provided which have high mechanical strength and flowability.

The styrenic polymers and the resin compositions comprising said styrenic polymers of the present invention have excellent flowability, and also excellent mechanical strength. Molded articles having excellent mechanical strength can be obtained, for example, by injection molding, extrusion molding or foam molding said resin composition. The flowability can be evaluated by a value of melt flow rate (MFR). The value of melt flow rate is usually determined by the method according to JIS K7210. The mechanical strength can be evaluated by a value for flexural breaking strength. The flexural breaking strength is usually determined by the method according to JIS K7203.

EXAMPLES

The present invention will now be described by means of Examples, which should not be construed as a limitation upon the scope of the present invention.

Methods of measurement used in Examples and Comparative Examples are described below.

(1) weight average molecular weight (Mw), Number average molecular weight (Mn) and Molecular weight distribution (Mw/Mn)

A polymer sample was dissolved in tetrahydrofuran solvent to form a solution having a concentration of 0.5 mg/ml and the solution was assayed by gel permeation chromatography (GPC). The GPC had a differential refractometer and the weight average molecular weight (Mw), number average molecular weight (Mn) and molecular weight distribution (Mw/Mn) were obtained by a calibration curve prepared using a monodispersed polystyrene.

(2) Rate of conversion in polymerization

The rate of conversion in polymerization was obtained as a value, expressed in percentage, of weight, after drying about 0.5 g of a polymerization solution, precisely weighed, drawn from a polymerization vessel and dried at 80° C. for 1 hour and at 150° C. for 2 hours under vacuum, divided by a weight before drying.

(3) Polymerization velocity

The polymerization velocity was obtained as a value of the rate of conversion in polymerization divided by the polymerization period.

EXAMPLE 1

5 g of a solution comprising polymerization initiator species shown in Table 1 as the free radical initiator, 2,2,6,6-tetramethyl-1-piperidinyloxy (TEMPO, manufactured by Aldrich) as a radical scavenger and styrene (purity: ≧99.9% by weight) as the styrenic compound were charged in an ampule, and the ampule was sealed. The sealed ampule was heated in a dry block bath and polymerization reaction was carried out under conditions shown in Table 1. This reaction and results are summarized in Table 1.

EXAMPLES 2 to 6

The polymerization reaction was carried out in the same manner as in Example 1 except for the conditions shown in Table 1 or 2. These reactions and results are summarized in Tables 1 and 2.

TABLE 1

| | Example No. | | |
|---|---|---|---|
| | 1 | 2 | 3 |
| Polymerization initiator species *1 | X1 | X1 | X1 |
| Concentration of polymerization initiator I (% by mol) | $8.60 \times 10^{-3}$ | $8.60 \times 10^{-3}$ | $8.60 \times 10^{-3}$ |
| Number of active site (number/molecule) | 1 | 1 | 1 |
| Active site concentration A (% by mol) | $8.60 \times 10^{-3}$ | $8.60 \times 10^{-3}$ | $8.60 \times 10^{-3}$ |
| Radical scavenger | TEMPO | TEMPO | TEMPO |
| Concentration of radical scavenger C (% by mol) | $1.29 \times 10^{-2}$ | $2.58 \times 10^{-2}$ | $8.60 \times 10^{-3}$ |
| C/A | 1.5 | 3.0 | 1.0 |
| Polymerization temperature T (°C.) | 120 | 120 | 130 |
| $10^3 \times I + 6 \times C/A + 0.86 \times (T - 100)$ | 34.8 | 43.8 | 40.4 |
| Polymerization period (hr) | 10 | 15 | 5 |
| Rate of conversion in polymerization (%) | 75 | 81 | 77 |
| Weight average molecular weight Mw (× 10,000) | 32 | 20 | 26 |
| Number average molecular weight Mn (× 10,000) | 19 | 12 | 14 |
| Molecular weight distribution (Mw/Mn) | 1.68 | 1.67 | 1.86 |
| Polymerization velocity (%/hr) | 7.5 | 5.4 | 15.4 |

*1 polymerization initiator
X1: benzoyl peroxide (Niper BW, manufactured by Nippon Yushi K.K.)

TABLE 2

| | Example No. | | |
|---|---|---|---|
| | 4 | 5 | 6 |
| Polymerization initiator species *1 | X1 | X1 | X1 |
| Concentration of polymerization initiator I (% by mol) | $8.60 \times 10^{-3}$ | $2.15 \times 10^{-2}$ | $2.15 \times 10^{-2}$ |
| Number of active site (number/molecule) | 1 | 1 | 1 |
| Active site concentration A (% by mol) | $8.60 \times 10^{-3}$ | $2.15 \times 10^{-2}$ | $2.15 \times 10^{-2}$ |
| Radical scavenger | TEMPO | TEMPO | TEMPO |
| Concentration of radical scavenger C (% by mol) | $1.72 \times 10^{-2}$ | $2.15 \times 10^{-2}$ | $3.23 \times 10^{-2}$ |
| C/A | 2.0 | 1.0 | 1.5 |
| Polymerization temperature T (°C.) | 130 | 120 | 120 |
| $10^3 \times I + 6 \times C/A + 0.86 \times (T - 100)$ | 46.4 | 44.7 | 47.7 |
| Polymerization period (hr) | 5 | 10 | 15 |
| Rate of conversion in polymerization (%) | 80 | 73 | 79 |
| Weight average molecular weight Mw (× 10,000) | 21 | 23 | 20 |
| Number average molecular weight Mn (× 10,000) | 12 | 14 | 13 |
| Molecular weight distribution (Mw/Mn) | 1.75 | 1.64 | 1.54 |
| Polymerization velocity (%/hr) | 16.0 | 7.3 | 5.3 |

*1 polymerization initiator
X1: benzoyl peroxide (Niper BW, manufactured by Nippon Yushi K.K.)

What is claimed is:

1. A process for producing a styrenic polymer by free radical polymerization, said process comprising the steps of:

(1) forming a mixture of a styrenic compound, a free radical initiator and a radical scavenger, wherein the concentration of the free radical initiator (I; % by mol) based on the amount of the styrenic compound satisfies the formula $$2 \times 10^{-3} \leq I \leq 4 \times 10^{-2}$$

and wherein the concentration of the radical scavenger (C; % by mol) and the active site concentration of the free radical initiator (A; % by mol) based on the amount of the styrenic compound satisfy the formula $$0.8 \leq C/A \leq 4;$$

(2) maintaining the mixture of step (1) under free radical polymerization conditions including a polymerization temperature (T) of from 100° C. to 140° C., wherein I, C, A and T satisfy the formula $$10^3 \times I + 6 \times C/A + 0.86 \times (T-100) \leq 48;$$

(3) discontinuing the polymerization when the conversion of the styrenic compound is from 40% to 85%; and (4) recovering a styrenic polymer, wherein the styrenic polymer recovered in step (4) has a weight average molecular weight (Mw) of 200,000 to 500,000, a number average molecular weight (Mn) of 100,000 to 450,000 and a molecular weight distribution (Mw/Mn) of from 1.1 to 2.

2. The process according to claim 1, wherein the molecular weight distribution (Mw/Mn) of the styrenic polymer is from 1.1 to 1.9.

3. The process according to claim 1, wherein the molecular weight distribution (Mw/Mn) of the styrenic polymer is from 1.5 to 1.8.

* * * * *